United States Patent [19]
O'Neill

[11] Patent Number: 5,365,982
[45] Date of Patent: Nov. 22, 1994

[54] AEROSOL CAN COMPACTION AND EVACUATION APPARATUS

[75] Inventor: Paul J. O'Neill, Novato, Calif.

[73] Assignee: Aervoe-Pacific Company, Inc., Gardenerville, Nev.

[21] Appl. No.: 155,487

[22] Filed: Nov. 22, 1993

Related U.S. Application Data

[63] Continuation-in-part of Ser. No. 758,793, Sep. 12, 1991.

[51] Int. Cl.⁵ .............................................. B65B 31/00
[52] U.S. Cl. ........................................ 141/51; 141/97;
    141/65; 141/7; 100/902; 222/83.5; 222/87;
    29/801; 29/403.1
[58] Field of Search .................... 141/7, 51, 65, 66, 93,
    141/97, 98, 1, 11, 329, 330, 82; 29/403.1, 403.3,
    426.1, 426.3, 426.4, 801, 426.5; 222/80, 81, 87,
    83.5; 81/3.2, 3.09; 100/902; 62/149, 529, 60

[56] References Cited

U.S. PATENT DOCUMENTS

| 4,166,481 | 9/1979 | Farris et al. | 141/1 |
| 4,349,054 | 9/1982 | Chipman et al. | 141/1 |
| 4,407,341 | 10/1983 | Feldt et al. | 141/97 |
| 4,459,906 | 7/1984 | Cound et al. | 100/902 X |
| 4,690,180 | 9/1987 | Gold | 141/51 |
| 5,265,762 | 11/1993 | Campbell et al. | 141/65 X |
| 5,271,437 | 12/1993 | O'Brien et al. | 141/51 |
| 5,273,088 | 12/1993 | Cripe et al. | 141/329 |

FOREIGN PATENT DOCUMENTS 1607991  10/1970  Germany ..................... 141/65

Primary Examiner—Ernest G. Cusick
Attorney, Agent, or Firm—Mark C. Jacobs

[57] ABSTRACT

An aerosol can compacting apparatus which evacuates the can for recovery of any residual propellant and product, therefrom and then compacts the can discharges the slug now compacted for collection. The apparatus can be operated in an automated fashion and preferably by compressed air.

16 Claims, 5 Drawing Sheets

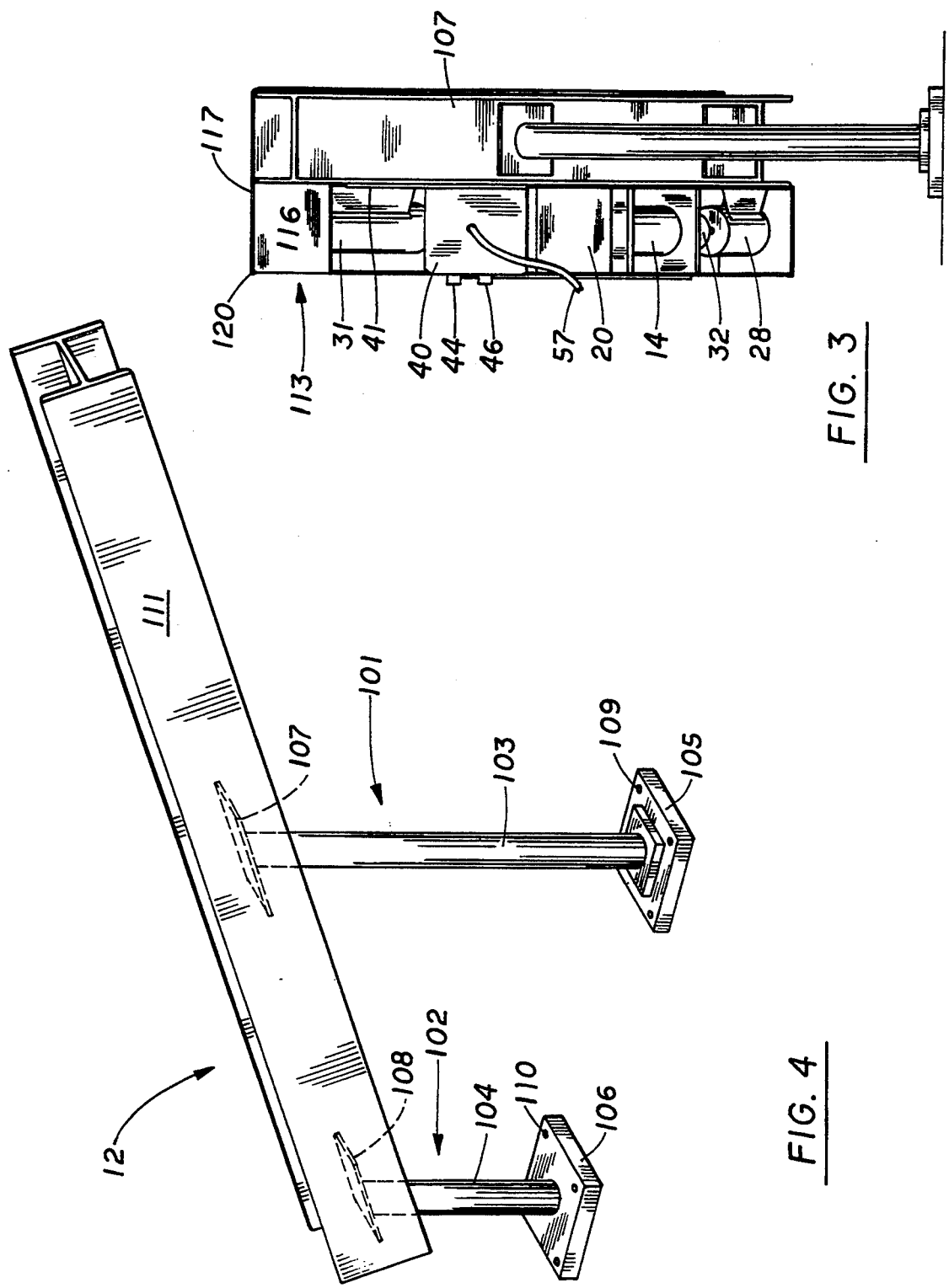

AEROSOL CAN COMPACTION AND EVACUATION APPARATUS

REFERENCE TO COPENDING APPLICATIONS

This application is a continuation-in-part of my copending application Ser. No. 07/758,793 filed Sep. 12, 1991.

FIELD OF THE INVENTION

This invention relates generally to the field of spray can compaction and recycling of aerosol cans used for spray paints, cleaners, lubricants and other liquid or mist format products which are delivered by a propellant.

BACKGROUND OF THE INVENTION

Aerosol dispensers have been available for a number of years for the application of hair sprays and other personal care products, as well as for paints, lubricants, insecticides and a multitude of other liquid products.

In the earlier days of aerosol marketing, "Freon" blends were widely used as propellants, principally because they were not flammable and were relatively nontoxic. However, in recent years, it was discovered that "Freons," when released into the atmosphere, migrated to the upper stratosphere and contributed to the depletion of ozone. Since ozone shields the surface of the earth against penetration of solar ultraviolet radiation, the use of "Freon" propellants was believed by many to have contributed to climate changes as well as to an increased incidence of skin cancers and cataracts. Accordingly, the U.S. Environmental Protection Agency (E.P.A.) banned the further use of "Freon" propellants. This forced aerosol packagers to select from alternative propellant systems, all of which while not contributing to the ozone depletion problem, nevertheless had serious disadvantages. Among these new propellants are the various hydrocarbons, consisting of blends of propane and butane mixtures. However, such hydrocarbon propellants are extremely flammable, and are in the chemical class known as volatile organic compounds, which are recognized as a significant cause of lower atmospheric air pollution or smog. Therefore, in even moderately populated areas of the country severe restrictions have been placed on the use of such compounds in many operations.

In addition to the selection of a gas propellant, a further problem in the aerosol packaging industry resides in the disposing of the used aerosol containers, particularly for large scale commercial users. After the product has been used up, the container remains charged with the propellant, whatever it may be, and when the propellant is a flammable gas, the container is considered hazardous waste, even if the product is a water-based liquid.

In addition to the concerns of discharging propellants into the atmosphere, which is coming under closer governmental regulation, there is the issue of costs, both in lost propellant and lost product. This invention provides a unique way to extract the propellant for recovery and possible re-use and permits the safe compaction of the empty can for recycling.

OBJECTS OF THE INVENTION

A first object of this invention is the efficient and safe recovery of propellant and product from aerosol containers.

A second object is to provide for the recovery of the residual propellant and product in a closed system in order to avoid discharge to the atmosphere.

A third object is to provide an apparatus to crush the aerosol container after it is evacuated in a single pass system to assure evacuation of contaminants and potentially hazardous wastes.

Another object is to provide a ram based compaction system for crushing a series of aerosol containers in rapid succession.

Yet another object is to provide a single apparatus to ventilate an aerosol can for the withdrawal of product and residual propellant and for the compaction of the container.

Other objects of the invention will in part be obvious and will in part appear hereinafter.

The invention accordingly comprises the apparatus possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

KNOWN PRIOR ART

Applicant is aware of the following U.S. patents, neither of which anticipates or renders obvious the invention of this application:

| | | |
|---|---|---|
| Cound et al | 4,459,906 | July 17, 1984 |
| Chipman et al | 4,349,054 | September 14, 1982 |

SUMMARY OF THE INVENTION

An aerosol compaction apparatus comprising a pair of opposed pistons, the first of which is for piercing an aerosol can for the evacuation of residual propellant and product therefrom and the second of which is for crushing the aerosol can, both of which actions transpire within a sealed compaction chamber. A passageway is provided from the compaction chamber for gaseous and liquid can contents to leave the chamber for collection.

BRIEF DESCRIPTION OF THE DRAWINGS

FIG. 3 is a front elevational view of the operating portion of this apparatus mounted to its support structure.

FIG. 4 is right side perspective view of only the support structure for the invention of this application.

DESCRIPTION OF PREFERRED EMBODIMENT

Figure 1:
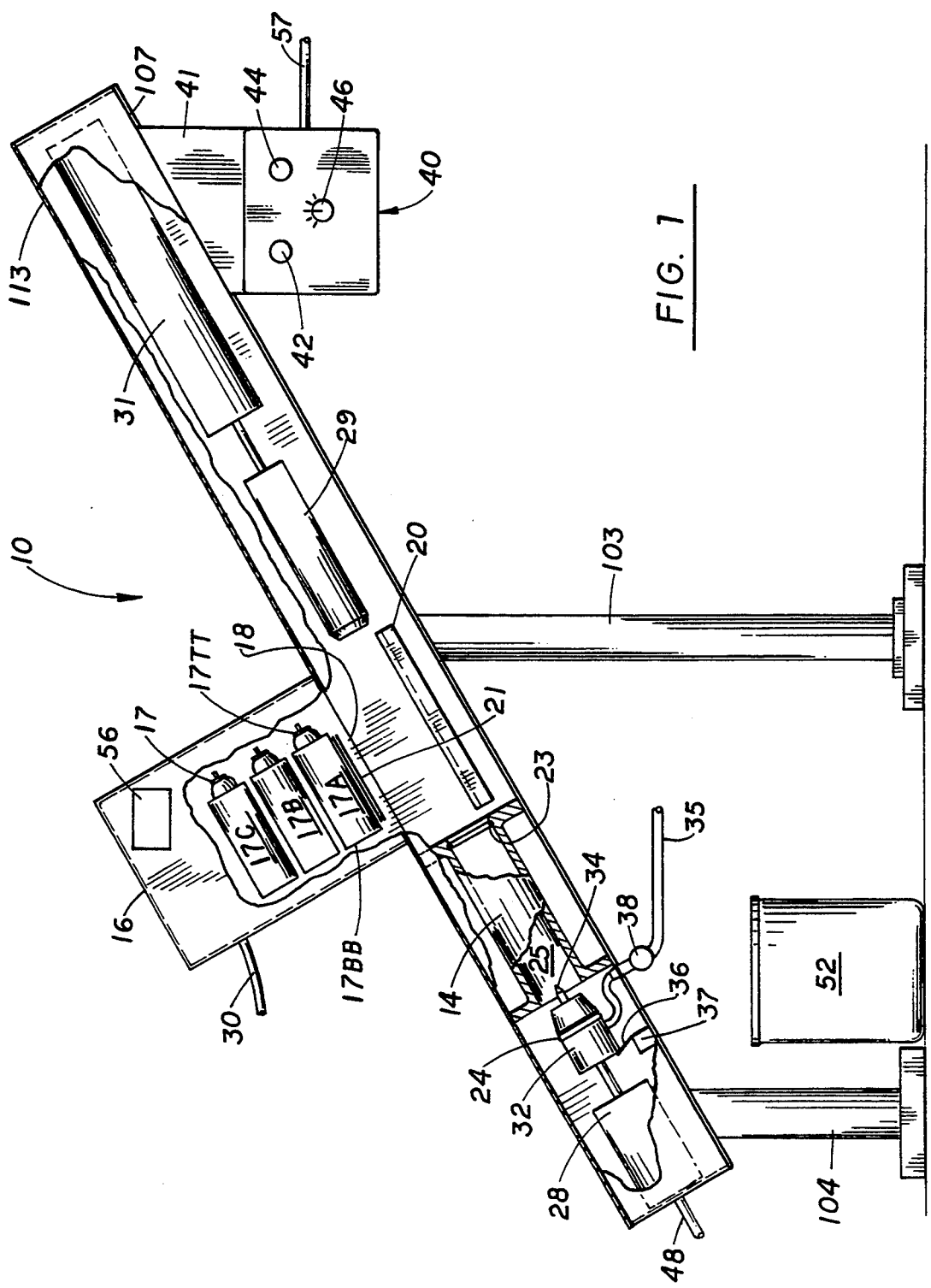
FIG. 1 is a right side elevational view of the can compaction apparatus of this invention, prior to commencement of operation.

The can compactor apparatus of this invention, shown in FIG. 1 is operated entirely by compressed air and will be discussed hereinbelow in detail. The associated propellant recovery system used to recover the residual propellant from the can to be crushed, is disclosed and claimed in my aforementioned parent application Ser. No. 07/758,793.

Considering the flammable nature of the products being processed the use of a nonelectric mode of operation provides a high measure of safety. This is enhanced by mounting the operational aspect 11 of the apparatus 10 to a support structure 12.

Turning first to FIG. 4, it is seen that the support structure 12 includes a primary pedestal 101 and a secondary pedestal 102. Primary pedestal 101 comprises an elongated generally vertical leg, 103, mounted at its lower end to a base 105 and to an angled support 107 at its upper end.

Secondary pedestal 102 comprises a leg 104 of lesser elevation mounted on its lower end to a base 106, and to an angled support 108, at its upper end. Optional mounting holes such as 109 and 110 can be used to receive bolts, not shown, to secure the apparatus 10 to a permanent location if so desired. Each of the angled supports 107, 108 are mounted to an I-beam 111 as by welding or via conventional bolts not shown. I-beam 111 serves as the main structural retaining means for the housing, 113 best seen in FIGS. 2 and 3.

Housing 113 is a generally elongated rectangular box having spaced side walls, 114, and 115; end walls 116, a top wall 117 having a cutout 118 for communication with the can feed hopper 16's open bottom, 18 and an open bottom. See also FIG. 1. The right side wall 115, as oriented from the rear of the apparatus, is preferably pivotally top mounted by a piano hinge 120. This side wall 115 also preferably contains a glass or polycarbonate window 119 such that the procedure of the apparatus can be safely viewed during operation. All other walls are fixedly secured to one another.

Let us now turn to the operational aspect of this invention. Hopper 16, which is open at the top, and which hopper is shown in cutaway in FIG. 1, is mounted in fixed position above the feed chute 20 disposed within the housing 113. The housing 113 is attached to the side of I-beam 107, which in turn is mounted to pedestal 103 as shown in FIG. 1. Upon actuation, to be discussed in more detail infra, pneumatically controlled feed finger 21, operated by air line 30, conventionally releases one can at a time from a series of aerosol cans 17, which series has been manually or automatically placed into can hopper 16. This individual can, here can 17A, drops from the hopper 16's open bottom 18 onto the feed chute 20.

Note that each of the individual cans 17 must be oriented with the top 17TT facing upwardly and the bottom 17BB facing leftwardly or downwardly. The slope of chute 20 allows can 17A to slide downwardly into compaction cylinder 14. This tubular unit, open at each end receives a can 17A to be first evacuated, and second compacted in size.

Compaction chamber 14 which comprises an open ended cylinder is sealed by a unique combination of seals. At the can entry end thereof an O-ring 23, protrudes slightly into the bore 25's interior. Piston 32 is slightly chamfered to ease entry into chamber 14 during operation. An o-ring 24 is disposed on the piston rearwardly of the chamfer, which o-ring 24 extends out slightly beyond the diameter of the piston to contact chamber 14's inner wall during operation. This effects a seal at the lower end. At the upper end of the compaction chamber aka compaction cylinder 14, only the aforementioned O-ring 23 effectuates closure as previously discussed.

First cylinder 28 upon actuation via conventional pneumatic means fed by air line 48, urges piston 32 axially into compaction cylinder 14 toward the can 17A now lying in place in the compaction cylinder. See FIG. 5. The second cylinder 31 then causes the compaction piston 29 to advance downwardly and to enter compaction cylinder 14 to effectuate a sealed connection with can 17A therebetween which is a view similar to FIG. 1, but at this point in time of the operation. See FIG. 6.

The entrapped can first comes into abutment engagement with hollow penetrating needle 34. As the can 17A is progressively crushed by the advancing piston 29, it is forced onto the penetrating needle 34, which needle punctures the underside 17BB of the can 17A. See FIG. 6. The fluid, if any, and the propellant, if any, contents of can 17A exit through needle 34 and line 35 for collection and/or recycling due to the pressure release within can 17A. The crushing continues until the advancing piston 29 has completed its predefined stroke to minimalize the can's spatial occupancy. A check valve 38 is provided in line 35 to prevent expelled product and/or propellant from backing up into the housing 113 after piston 32 withdraws to commence its next cycle.

It is within the skill of the art to render the length of the compacting stroke adjustable to accommodate cans of different heights within the same apparatus for complete crushing.

Figure 5:
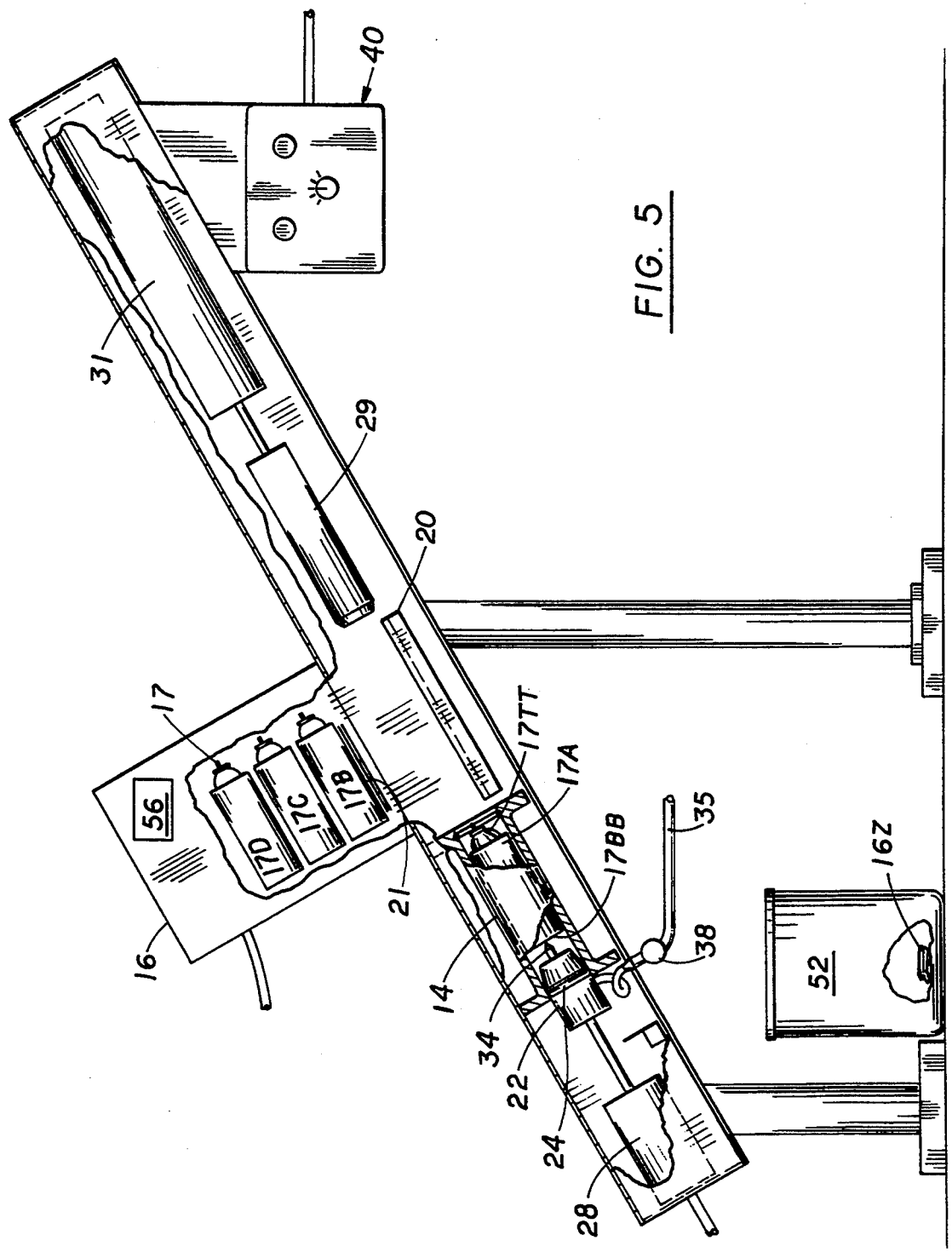
FIG. 5 is a figure similar to FIG. 1 at a first advanced point in time during the operation of this apparatus.
Figure 6:
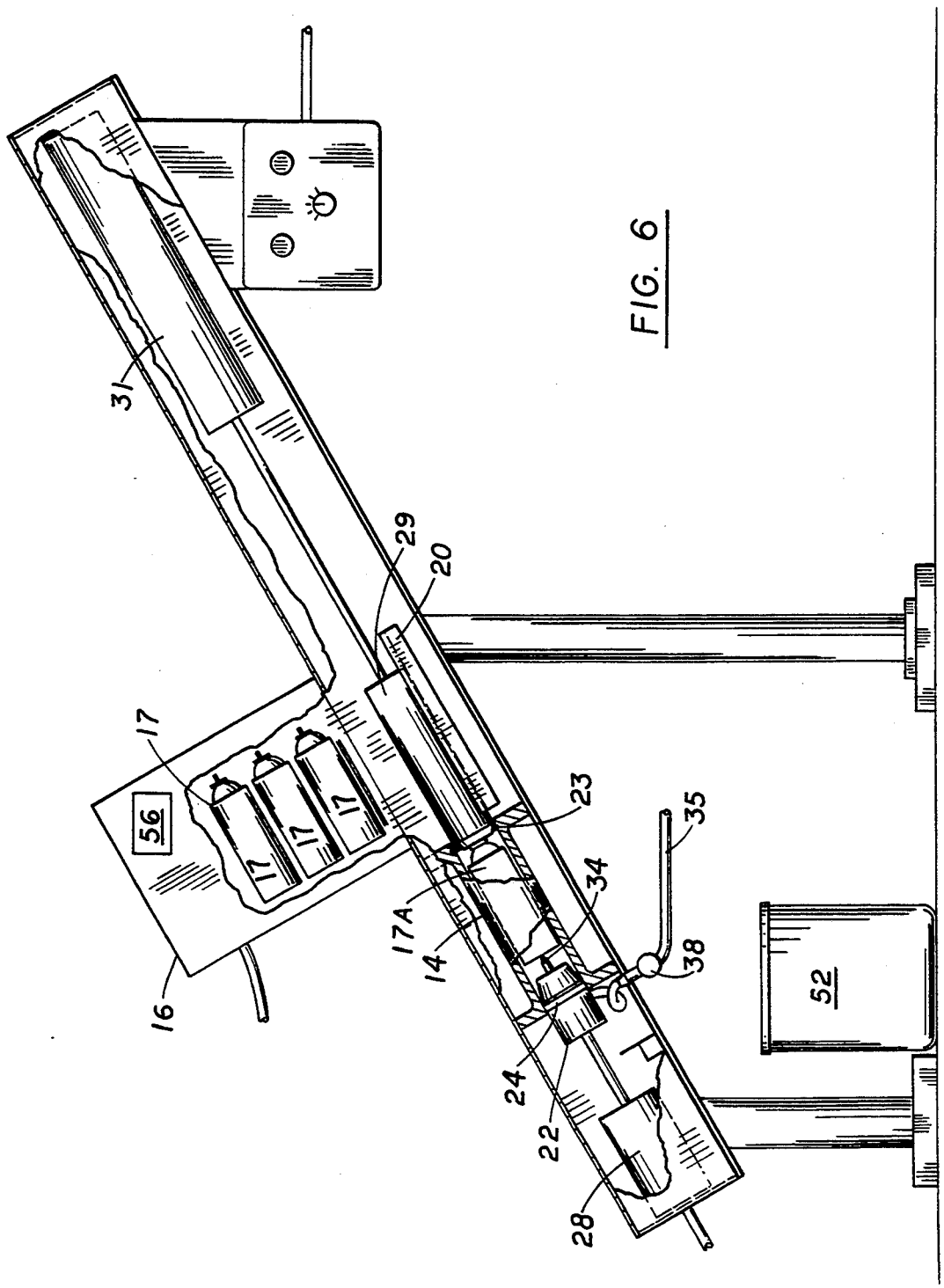
FIG. 6 is a figure similar to FIG. 5 at a second advanced point in time during the operation of this apparatus.

When a timed interval occurs coinciding with the complete compaction of can 17A, and evacuation of its content has been completed, piston 32 withdraws from cylinder 25, thereby permitting the now compacted can slug to drop free through the open bottom of housing 113 into collection container 52 next to the previously compacted can slug 16Z, seen in FIG. 5.

A valve 37 see FIG. 1 located adjacent the lower or piercing piston 32 and actuated by contact of said piston 32, with actuator 36 at the time of the stroke terminus of cylinder 31, directs both the piercing cylinder 28 and the compacting cylinder 31 to retract to their respective home positions in readiness for the next can drop cycle. This valve 37 is connected to the logic found in control box 40 for operating the apparatus. (See FIG. 2) Line 57 is the master air line into control box 40.

Figure 2:
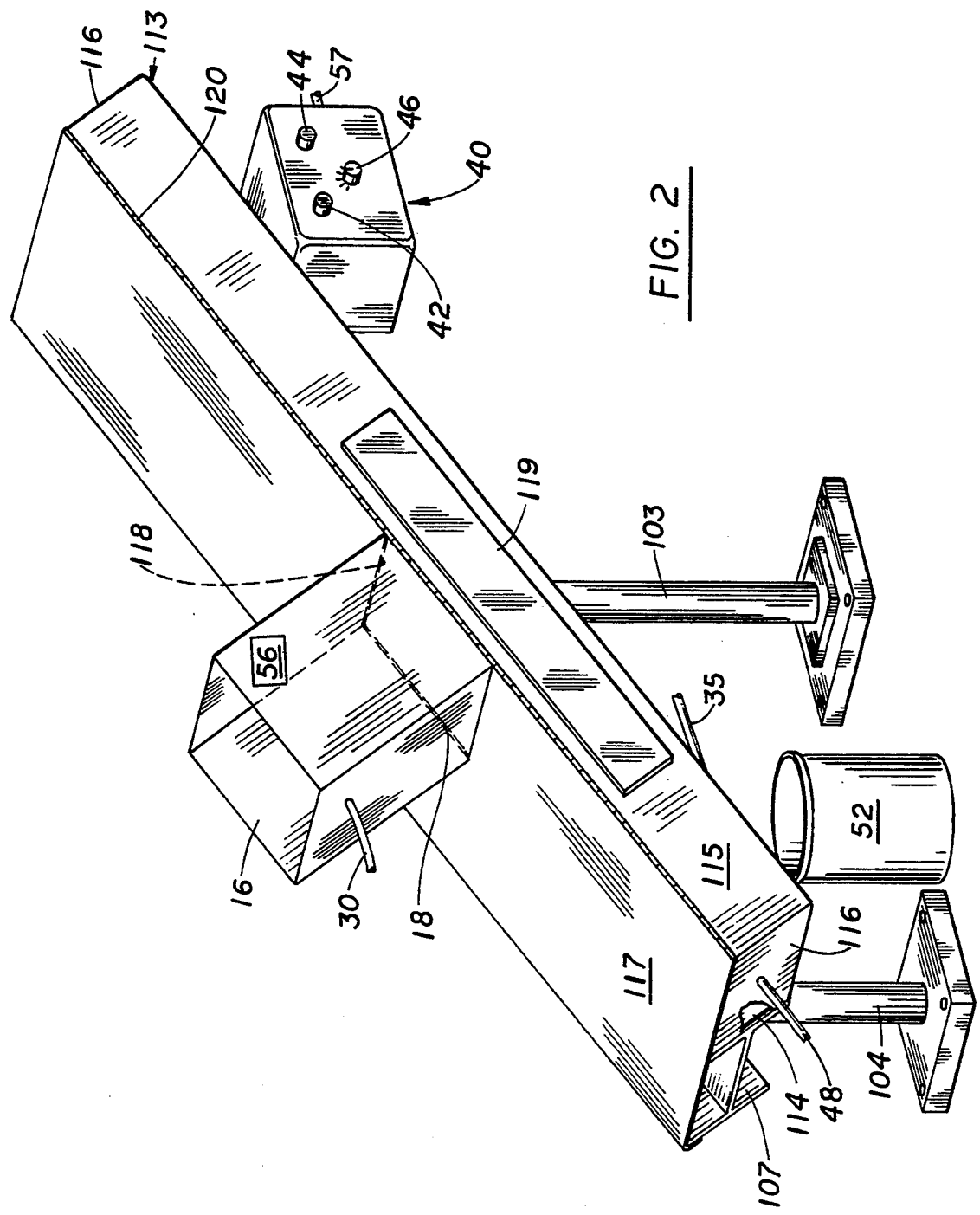
FIG. 2 is a right side perspective view of the essential elements of the can compaction apparatus of this invention, with the housing being shown in cutaway, prior to a commencement of the operation of this invention.

In FIG. 2, a control box 40 is shown mounted to the I-beam 111 by an interposed gusset 41 welded to said I-beam 111. As with all machinery, a safety emergency stop control is present. Such a switch is designated 42. The normal start button to operate the apparatus is switch 44. Multi-position switch 46 permits one of several operational modes to be selected. For example it may be desired in some instances to merely punch and safely evacuate the contents of the can, but not actually crush it. It is within the skill of the art to build in any needed limit switches to timely stop the motion of the compaction piston 29. Air line 57 is connected to the shop air supply.

A decal 56 may be provided on hopper 16 to advise the operator about proper can orientation.

PROPELLANT RECOVERY SYSTEM

The aerosol can contents, as noted above exit the apparatus through line 35 and preferably enter a heat exchanger, not seen, before flowing into a separation tank, also not seen, within which the propellant gas(es) are separated from residual product. The details of a suitable propellant recovery process forms the subject matter of my co-pending application Ser. No. 08/55,486, which is a division application of Ser. No. 07/758,793, now U.S. Pat. No. 5,222,093.

It is understood that only the essential aspects of the operation of the apparatus of this invention has been discussed. Every little valve and compressed air or other compressed fluid line needed to carry out the tasks to actuate this apparatus are not shown because the selection, placement implementation and actuation of same by pneumatic means are well within the realms of the skill of the art. It is also understood that the logic circuitry to carry out the functions described above are within the routine skill of the engineer.

In addition, many modifications and variations of the present invention are possible in light of the above teachings. Thus, while it has been discussed that for safety the two cylinders should be operated by compressed air or other nonflammable fluid, if the propellant in the cans being crushed is carbon dioxide, or an inert gas such as nitrogen, no reason is seen why an electrically operated apparatus could not be manufactured that would operate with the same essential components.

While the use of a feed hopper having a feed finger has been disclosed, it is also recognized that this hopper can be replaced by a feed table adapted to feed cans one at a time into the sealable compaction chamber. Indeed, to lower costs, cans can be manually placed for delivery into the sealable chamber.

From the drawings it is seen that the feed chute and the compaction chamber are angularly disposed. An inclination of about 30 degrees from the horizontal is suggested to ensure a good gravity feed of the cans into the compaction chamber.

Since certain changes may be made in the described apparatus without departing from the scope of the invention herein involved, it is intended that all matter contained in the above description and shown in the accompanying drawings shall be interpreted as illustrative and not in a limiting sense.

I claim:

1. An aerosol can compaction apparatus comprising a housing having a sealable compaction chamber closeable on each end, and a pair of opposed moving pistons, the said compaction chamber being closeable by said pair of opposed moving pistons, the first of which pistons includes a needle for piercing an aerosol can, and a second piston for crushing an aerosol can, all within said compaction chamber;

and a passageway from said first piston for evacuation of the fluid content of said aerosol can's contents from said compaction chamber and wherein said pistons enter said compaction chamber axially to seal said chamber during compaction.

2. An aerosol can compaction apparatus as described in claim 1 further including a feed means to supply cans to said sealable chamber.

3. An aerosol can compaction apparatus as described in claim 2 wherein the feeding means comprises a feed hopper having an actuatable finger to control the release of cans one at a time to the sealable chamber.

4. The apparatus of claim 2 wherein the can feeding means is a feed hopper oriented at a slope to feed said aerosol cans by gravity into said compaction chamber.

5. In the aerosol can compaction apparatus as described in claim 1 wherein said needle is hollow and mounted on said first piston, said hollow needle being in fluid communication with a line, together comprising said passage way out of said compaction chamber.

6. In the apparatus of claim 1 wherein the apparatus is actuated by a nonflammable fluid.

7. In the apparatus of claim 1 further including can slug collection means associated with said apparatus.

8. An aerosol can compaction apparatus comprising a housing having a sealable compaction chamber closeable on each end, and a pair of opposed moving pistons, the said compaction chamber being closeable by said pair of opposed moving pistons, the first of which pistons includes a needle for piercing an aerosol can, and a second piston for positioning an aerosol can for puncture by said first piston, all within said compaction chamber;

and a passageway from said first piston for evacuation of the fluid content of said aerosol can's contents from said compaction chamber.

9. The compaction apparatus of claim 8 wherein said housing is slopingly disposed with the first piston moving angularly upwardly to pierce said can, and said second piston moving angularly downward to position said can.

10. The compaction apparatus of claim 9 wherein said housing is slopingly disposed with the first piston moving angularly upwardly to pierce said can, and said second piston moving angularly downward to crush said can.

11. In the apparatus of claim 10 further including a can feeding means oriented at a slope to feed cans by gravity to said sealable chamber.

12. An aerosol can compaction apparatus comprising a housing having a sealable chamber; and having a feed chute, said feed chute being in communication with a can feeding means and in communication with said sealable chamber, said chamber being closeable on each end, by a pair of opposed moving pistons, the first of which pistons includes a needle for piercing an aerosol can, and a second piston for positioning an aerosol can for piercing by said first piston, and for crushing said can after piercing, all within said compaction chamber;

and a passageway from said first piston for evacuation of the fluid content of said aerosol can's contents from said compaction chamber;

wherein said can feeding means is oriented at a slope to feed cans to said feed chute for delivery by gravity to said sealable camber wherein said pistons enter said compaction chamber axially to seal said chamber during compaction, wherein the housing is a generally elongated rectangular box having a pair of elongated spaced side walls, spaced end walls and a top and bottom wall and further wherein one of said side walls is pivotally mounted for access to the interior of said apparatus.

13. In the apparatus of claim 12 wherein said pivotable side wall includes a transparent window therein.

14. The apparatus of claim 2 further comprising an I-beam attached to said housing for mounting to at least one pedestal.

15. The apparatus of claim 14 further including at least one mounting pedestal, attached to said I-beam which mounting pedestal orients said apparatus at a slope relative to the ground.

16. An aerosol can compaction apparatus comprising a housing having a sealable chamber closeable on each end, and a pair of opposed moving pistons, the said compaction chamber being closeable by said pair of opposed moving pistons, the first of which pistons includes a needle for piercing an aerosol can, and a second piston for positioning an aerosol can for piercing by said first piston, and for crushing said can after piercing, all within said compaction chamber;

and a passageway from said first piston for evacuation of the fluid content of said aerosol can's contents from said compaction chamber.

* * * * *